US008929676B2

(12) United States Patent
van der Merwe et al.

(10) Patent No.: US 8,929,676 B2
(45) Date of Patent: Jan. 6, 2015

(54) BLURRING BASED CONTENT RECOGNIZER

(75) Inventors: Rudolph van der Merwe, Portland, OR (US); Richard Eugene Crandall, Portland, OR (US); Samuel Gordon Noble, Portland, OR (US); Bertrand Serlet, Palo Alto, CA (US); Stanislav Kounitski, Portland, OR (US)

(73) Assignee: Apple Inc., Cupertino, CA (US)

( * ) Notice: Subject to any disclaimer, the term of this patent is extended or adjusted under 35 U.S.C. 154(b) by 1325 days.

(21) Appl. No.: 12/433,120

(22) Filed: Apr. 30, 2009

(65) Prior Publication Data
US 2010/0189367 A1  Jul. 29, 2010

Related U.S. Application Data

(63) Continuation of application No. 12/360,831, filed on Jan. 27, 2009.

(51) Int. Cl.
*G06K 9/40* (2006.01)
*G06K 9/18* (2006.01)
*G06T 7/00* (2006.01)

(52) U.S. Cl.
CPC .............. *G06T 7/0081* (2013.01); *G06K 9/183* (2013.01); *G06T 2207/22076* (2013.01); *G06T 2207/20148* (2013.01); *G06T 2207/10004* (2013.01); *G06T 2207/20141* (2013.01); *G06T 7/0087* (2013.01)
USPC .......................................... 382/255; 382/170

(58) Field of Classification Search
USPC ......... 382/101, 107, 168–173, 181, 195, 228, 382/229, 254, 255, 280; 725/118, 119; 348/345–357
See application file for complete search history.

(56) References Cited

U.S. PATENT DOCUMENTS

| 5,949,053 | A | 9/1999 | Zlotnick |
| 6,021,220 | A | 2/2000 | Anderholm |
| 6,081,620 | A | 6/2000 | Anderholm |
| 6,993,573 | B2 | 1/2006 | Hunter |
| 7,051,935 | B2 | 5/2006 | Sali et al. |
| 7,136,517 | B2 * | 11/2006 | Ugolin et al. ................. 382/129 |
| 7,210,631 | B2 | 5/2007 | Sali et al |
| 7,237,721 | B2 | 7/2007 | Bilcu et al. |
| 7,313,276 | B2 * | 12/2007 | Simelius et al. ............. 382/181 |
| 7,356,254 | B2 * | 4/2008 | Aoyama ....................... 396/147 |
| 7,636,486 | B2 * | 12/2009 | Steinberg et al. ............ 382/255 |
| 7,639,889 | B2 * | 12/2009 | Steinberg et al. ............ 382/255 |

(Continued)

OTHER PUBLICATIONS

Bishop et al. "Developments of the Generative Topographic Mapping" Nearocomputing 21 (1998) pp. 1-19.*

(Continued)

*Primary Examiner* — Chan Park
*Assistant Examiner* — Mia M Thomas
(74) *Attorney, Agent, or Firm* — Fish & Richardson P.C.

(57) ABSTRACT

Methods, systems, and apparatus, including computer program products, for identifying regions of interest in an image and identifying a barcode in a degraded image are provided. A region of interest is identified by pre-processing an image, generating a binary image based on a metric calculated on the pre-processed image, and analyzing regions of the image identified using connected components and other analysis. A barcode is identified by searching a population of barcodes, degrading ideal image intensity profiles of candidate barcodes, and comparing the degraded ideal image intensity profiles to an image intensity profile of the degraded image.

22 Claims, 11 Drawing Sheets

(56) References Cited

U.S. PATENT DOCUMENTS

| | | | |
|---|---|---|---|
| 7,660,478 B2* | 2/2010 | Steinberg et al. ............ 382/255 |
| 7,676,108 B2* | 3/2010 | Steinberg et al. ............ 382/255 |
| 7,680,620 B2* | 3/2010 | Umeda ........................ 702/116 |
| 7,689,615 B2* | 3/2010 | Burges et al. ................ 707/723 |
| 7,697,778 B2* | 4/2010 | Steinberg et al. ............ 382/255 |
| 7,979,298 B2* | 7/2011 | Cheng et al. ................ 705/7.28 |
| 8,049,812 B2* | 11/2011 | Whillock et al. ............ 348/348 |
| 8,049,813 B1* | 11/2011 | Huang et al. ................ 348/349 |
| 8,090,246 B2* | 1/2012 | Jelinek ............................ 396/18 |
| 8,098,901 B2* | 1/2012 | Hamza ........................ 382/117 |
| 8,102,314 B2* | 1/2012 | Bamberger et al. ......... 342/451 |
| 8,233,055 B2* | 7/2012 | Matsunaga et al. ........ 348/222.1 |
| 8,255,991 B1 | 8/2012 | Hackborn et al. |
| 8,467,987 B1 | 6/2013 | Davidson et al. |
| 8,523,075 B2 | 9/2013 | van der Merwe et al. |
| 8,537,272 B2 | 9/2013 | Jelinek et al. |
| 2002/0046140 A1 | 4/2002 | Kano et al. |
| 2003/0002746 A1* | 1/2003 | Kusaka ........................ 382/255 |
| 2003/0076408 A1 | 4/2003 | Dutta |
| 2003/0130035 A1 | 7/2003 | Kanarat |
| 2004/0001623 A1* | 1/2004 | Ugolin et al. ................. 382/170 |
| 2004/0004125 A1 | 1/2004 | Havens et al. |
| 2004/0078351 A1* | 4/2004 | Pascual-Marqui et al. ..... 706/15 |
| 2004/0114187 A1* | 6/2004 | Furukawa .................... 358/3.08 |
| 2004/0117629 A1* | 6/2004 | Koto et al. .................... 713/176 |
| 2004/0218055 A1* | 11/2004 | Yost et al. .................. 348/208.6 |
| 2004/0268381 A1* | 12/2004 | Simelius et al. ................ 725/19 |
| 2005/0006479 A1 | 1/2005 | He et al. |
| 2005/0185159 A1 | 8/2005 | Rosenbluth et al. |
| 2005/0258249 A1 | 11/2005 | Giebel et al. |
| 2006/0091221 A1 | 5/2006 | He et al. |
| 2006/0093233 A1* | 5/2006 | Kano et al. .................... 382/254 |
| 2006/0100958 A1* | 5/2006 | Cheng et al. ..................... 705/38 |
| 2006/0101106 A1 | 5/2006 | Subbarao |
| 2006/0195440 A1* | 8/2006 | Burges et al. ..................... 707/5 |
| 2006/0213999 A1 | 9/2006 | Wang et al. |
| 2006/0222205 A1* | 10/2006 | Porikli et al. .................. 382/103 |
| 2007/0072250 A1 | 3/2007 | Kim et al. |
| 2007/0073502 A1* | 3/2007 | Umeda .......................... 702/96 |
| 2007/0081729 A1 | 4/2007 | Ogawa |
| 2007/0140570 A1 | 6/2007 | Curry |
| 2007/0150850 A1 | 6/2007 | Itoh |
| 2007/0175998 A1 | 8/2007 | Lev |
| 2007/0201757 A1 | 8/2007 | Madej et al. |
| 2007/0242883 A1 | 10/2007 | Kruppa |
| 2008/0044103 A1 | 2/2008 | Dowski et al. |
| 2008/0118181 A1 | 5/2008 | Potuluri et al. |
| 2008/0215401 A1* | 9/2008 | Cheng et al. ........................ 705/7 |
| 2009/0110303 A1* | 4/2009 | Nishiyama et al. ........... 382/225 |
| 2009/0115857 A1* | 5/2009 | Li et al. ...................... 348/208.1 |
| 2009/0129632 A1 | 5/2009 | Ma et al. |
| 2009/0208053 A1* | 8/2009 | Kent ............................ 382/103 |
| 2009/0277962 A1* | 11/2009 | McCloskey .............. 235/462.01 |
| 2009/0278928 A1* | 11/2009 | McCloskey .................... 348/143 |
| 2010/0103048 A1* | 4/2010 | Bamberger et al. ........... 342/451 |
| 2010/0182440 A1 | 7/2010 | McCloskey |
| 2010/0220896 A1 | 9/2010 | McCloskey et al. |
| 2010/0230493 A1* | 9/2010 | Akiyama ...................... 235/437 |
| 2011/0073650 A1 | 3/2011 | Chiou et al. |
| 2012/0014604 A1 | 1/2012 | Gaubatz et al. |
| 2012/0018518 A1* | 1/2012 | Strom et al. ............. 235/462.04 |
| 2012/0048937 A1 | 3/2012 | Dahari |
| 2013/0153662 A1 | 6/2013 | Narasa Prakash |
| 2013/0170765 A1* | 7/2013 | Santos et al. .................. 382/255 |

OTHER PUBLICATIONS

Whitley, "A Genetic Algorithm Tutorial", Technical Report CS-93-103 (Revised), Nov. 10, 1993, Department of Computer Science, Colorado State University, 38 pages.

van der Merwe et al., "Blurring Based Content Recognizer", U.S. Appl. No. 12/360,831, filed Jan. 27, 2009.

Flusser, Jan, et al., "Recognition of Blurred Images by the Method of Moments," IEEE Transactions on Image Processing, vol. 5, No. 3, Mar. 1996, pp. 533-538.

"Finding the Barcode: Top-level Description of Barcode Detection Algorithm," Jon's Java Imaging Library (jjil), for mobile image processing [online], updated Mar. 11, 2008. Retrieved from the Internet: <URL: http://code.google.com/p/jjil/wild/FindingTheBarcode>, [retrieved on Apr. 8, 2009], 2 pages.

C.S. Turner, "Slope filtering: An FIR approach to linear regression," IEEE Signal Processing Magazine, vol. 25, No. 6, pp. 159-163, 2008, 4 pages.

Tapia, et al. "Recogniation of On-Line Handwritten Mathematical Expressions in the E-Chalf System an Extension" IEEE Conference on Document Analysis and Recognition (ICDAR) 2005, 5 pages.

Tappert, et al. "On-Line Handwriting Recognition—A Survey" IEEE (1988) 10 pages.

Kim et al., "Joint Nonuniform Illumination Estimation and Deblurring for Bar Code Signals," Oct. 2007, Optical Society of America Optics Express, pp. 1-21.

Lew et al., "Non-Blind Barcode Deconvultion by Gradient Projection," Aug. 17, 2012, pp. 1-16.

Esedoglu, "Blind Deconvultion of Bar Code Signals," Mathematics Department, UCLA, 2003, pp. 121-135.

Dumas et al., "An Evolutionary Approach for Blind Deconvolution of Barcode Images with Non Uniform Illumination," IEEE (2011), pp. 1-6.

Juric, "Edge Detection in Bar Code Signals Corrupted by Integrated Time-Varying Speckle," Pattern Recognition, 38 (2005), pp. 1-11.

* cited by examiner

BLURRING BASED CONTENT RECOGNIZER

CROSS-REFERENCE TO RELATED APPLICATION

This application is a continuation application of U.S. patent application Ser. No. 12/360,831, filed on Jan. 27, 2009, the entire disclosure of which is incorporated herein by reference.

TECHNICAL FIELD

This disclosure relates to image processing.

BACKGROUND

Noise and blur can reduce the quality of an image. Noise is variation in brightness or color of the pixels in an image and can be distributed according to a probability distribution (e.g., a uniform distribution, a Gaussian (normal) distribution, a Raleigh distribution, etc.). Noise can be concentrated in one or more color channels of an image or spread throughout an image. Examples of noise include graininess, color variation, and salt and pepper speckling.

Blur is a distortion of an image. An image can be blurred because, for example, the camera used to capture the image was out of focus, the camera moved while the image was being captured, the subject of the image moved while the image was being captured, the shutter-speed was too slow or too fast for the light conditions, or the lens of the camera was dirty.

Noise and blur are particular problems for images captured using mobile devices. The quality of mobile device cameras is often limited by size and weight constraints. The charge coupled devices used to capture the images on mobile devices often have bad low light capabilities and high noise characteristics. In addition, many mobile device cameras have a fixed focus, meaning that frequently, in order for the device to be close enough to capture necessary details in the image, the focal distance of the fixed focus lens will be violated, resulting in severe blur in the image.

FIG. 1 illustrates an example blurred image 102, and the de-blurred version of the image once an example prior art de-blur filter has been applied 104.

An image can be characterized as having a region of interest and additional visual information outside the region of interest. A region of interest is a region of the image that contains an object of interest, e.g., a barcode, a face, a license plate, or text. Other objects of interest are also possible.

For example, the image 102 contains a barcode 103 near the center of the image, but also has additional visual information such as the text 105 in the bottom right of the image and part of another barcode 107 in the upper right of the image. Assuming the object of interest is a complete barcode, the region of interest would be the region of the image containing a barcode 103. Everything else in the image is outside the region of interest.

Often an image is distorted because of noise as well as blur. The presence of noise in an image increases the likelihood of artifacts being introduced during de-blurring. The amount of de-blurring that can be done is limited by noise in the image. Noise introduces false edges in an image, and therefore artifacts, such as ringing, will form around noise pixels if the level of de-blur is high. Traditional de-blur filters may also enhance the noise in the image, resulting in an image such as 104 which has less blur than the original image 102, but also has additional noise. The noise includes black dots throughout the white portions of the image and white dots throughout the black portions of the image. The enhanced noise can make a de-blurred image difficult to decipher.

SUMMARY

In general, one aspect of the subject matter described in this specification can be embodied in a method that includes the following. An image is received. The image is pre-processed, resulting in a pre-processed image. A metric is calculated based on the pre-processed image. A binary image is generated from the pre-processed image based on the metric. One or more regions of the binary image are identified using connected components analysis. A region of interest in the image is selected based on an analysis of the identified regions of the binary image. A probabilistic cost function is used to refine the region of interest. Other implementations include corresponding system, apparatus, computer program products, and computer readable media.

These and other implementations can optionally include one or more of the following features. The image can include a barcode. Pre-processing the image can include applying an image gradient magnitude filter to the image. The analysis of the identified regions can include analyzing the mass, aspect ratio, shape, or image moment of each region.

In general, another aspect of the subject matter described in this specification can be embodied in methods that include the following. A degraded image of a first barcode is received. An image intensity profile of the degraded image is generated. A population of barcodes is searched. The search includes selecting a candidate barcode from the population of barcodes and comparing a degraded version of the ideal image intensity profile of the candidate barcode to the image intensity profile of the degraded image. A barcode is selected from the population of barcodes based on the comparison. Other implementations include corresponding systems, apparatus, computer program products, and computer readable media.

These and other implementations can optionally include one or more of the following features. A region of interest containing a barcode in the degraded image can be identified and the image intensity profile of the degraded image can be an image intensity profile of the region of interest.

Context information about the first degraded image can be received and the search can be biased based on the context information. The context information can include an approximation of a physical location corresponding to where the degraded image was captured. The context information can include previous selections of one or more barcodes corresponding to one or more other degraded images captured at one or more physical locations that are approximately the same as a physical location where the degraded image was captured. The context information can be received from a data processing apparatus associated with one or more objects in a vicinity of where the degraded image was captured.

Accelerometer data regarding a device used to capture the degraded image can be received. The accelerometer data can be used to estimate a motion blur in the degraded image and the degraded version of the ideal image intensity profile of the candidate barcode can be generated using the estimated motion blur. The accelerometer data can be used to estimate a degree of variance from the horizontal or vertical axis of the device at the time the degraded image was captured and the degraded version of the ideal image intensity profile of the candidate barcode can be generated using the estimated degree of variance.

Calibration information can be received, and the degraded version of the ideal image intensity profile of the candidate barcode can be generated using the calibration information.

Searching the population of barcodes can further include repeating the selecting and comparing steps for each barcode in the population of barcodes. Searching the population can further include using a genetic algorithm to direct the search.

Information corresponding to the final barcode can be retrieved from a database.

Comparing a degraded version of the ideal image intensity profile of the candidate barcode to an image intensity profile of the degraded image can further include pre-computing a degraded version of parts of image intensity profiles of barcodes in the population of barcodes. The degraded version of the ideal image intensity profile of the candidate barcode can then be generated by adding the identified degraded versions of parts of the ideal image intensity profile of the candidate barcode. Comparing a degraded version of the ideal image intensity profile of the candidate barcode to an image intensity profile of the degraded image can further include pre-computing a plurality of error signals for each of a plurality of regions in an image intensity profile space. An error signal corresponding to a degraded version of the ideal image intensity profile of the candidate barcode can be identified for each of the plurality of regions; The identified error signals can be combined.

In general, another aspect of the subject matter described in this specification can be embodied in methods that include the following. A degraded image of a barcode is received. An image intensity profile is generated for the degraded image. A population of barcodes is searched. The searching includes identifying a current population of barcodes and repeating the following steps one or more times: for each barcode in the current population, a fitness score comparing a degraded version of an ideal intensity profile corresponding to the barcode to an intensity profile of the degraded image is calculated and then the current population is updated using the calculated fitness scores. An barcode is selected from the population of barcodes based on the calculated fitness scores. Other implementations include corresponding systems, apparatus, computer program products, and computer readable media.

In general, another aspect of the subject matter described in this specification can be embodied in methods that include the following. An image is received. The image is pre-processed, resulting in a pre-processed image. A metric is calculated based on the pre-processed image. A binary image is generated from the pre-processed image based on the metric. One or more regions of the binary image are identified using connected components analysis. A region of interest in the image is selected based on an analysis of the identified regions of the binary image. A probabilistic cost function is used to refine the region of interest. An image intensity profile is generated for the refined region of interest. A population of barcodes is searched. The searching includes identifying a current population of barcodes and repeating the following steps one or more times: for each barcode in the current population, a fitness score comparing a degraded version of an ideal intensity profile corresponding to the barcode to an intensity profile of the refined region of interest is calculated and then the current population is updated using the calculated fitness scores. An barcode is selected from the population of barcodes based on the calculated fitness scores. Other implementations include corresponding systems, apparatus, computer program products, and computer readable media.

Particular embodiments of the subject matter described in this specification can be implemented to realize one or more of the following advantages. A region of interest in an image can be identified to aid in image processing. A de-blurred version of an image can be identified without increasing noise or other artifacts in the image, because the image is never actually de-blurred—rather idealized images are blurred and compared to the blurred image until a match is found.

The details of one or more embodiments are set forth in the accompanying drawings and the description below. Other features, objects, and advantages will be apparent from the description and drawings, and from the claims.

DETAILED DESCRIPTION

Figure 1:
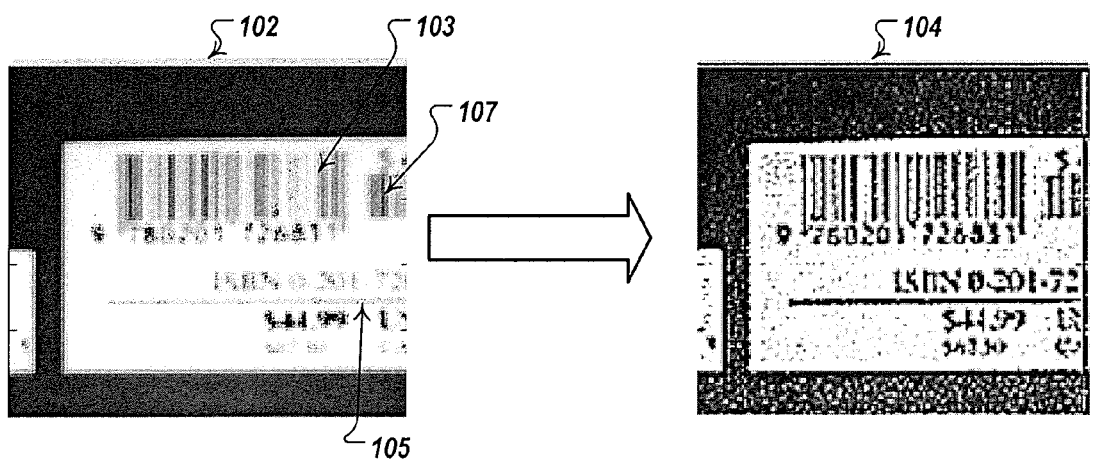
FIG. 1 illustrates an example blurred image and the image once an example prior art de-blur filter has been applied.

As FIG. 1 illustrates, de-blurring an image can enhance noise and artifacts in the image, making it difficult to detect what was originally in the image. An alternative technique for identifying a non-blurred version of a blurred image is to blur candidate images and compare them to the blurred image. If one or more regions of interest can be identified, and the regions of interest contains an object of interest, a more effective method of determining a non-blurred version of a blurred image is to select candidate objects of interest, distort a representation of a feature of the objects of interest (e.g., by adding blur to an ideal image intensity profile of the candidate object of interest to estimate the blur in the original image), and compare the distorted representations of the candidate objects to the regions of interest in the original blurred image until a sufficiently close candidate object is found. This process identifies a candidate non-blurred image that corresponds to the blurred image instead of applying traditional de-blurring filters to the blurred image, and also allows identification of the object of interest.

Figure 2:
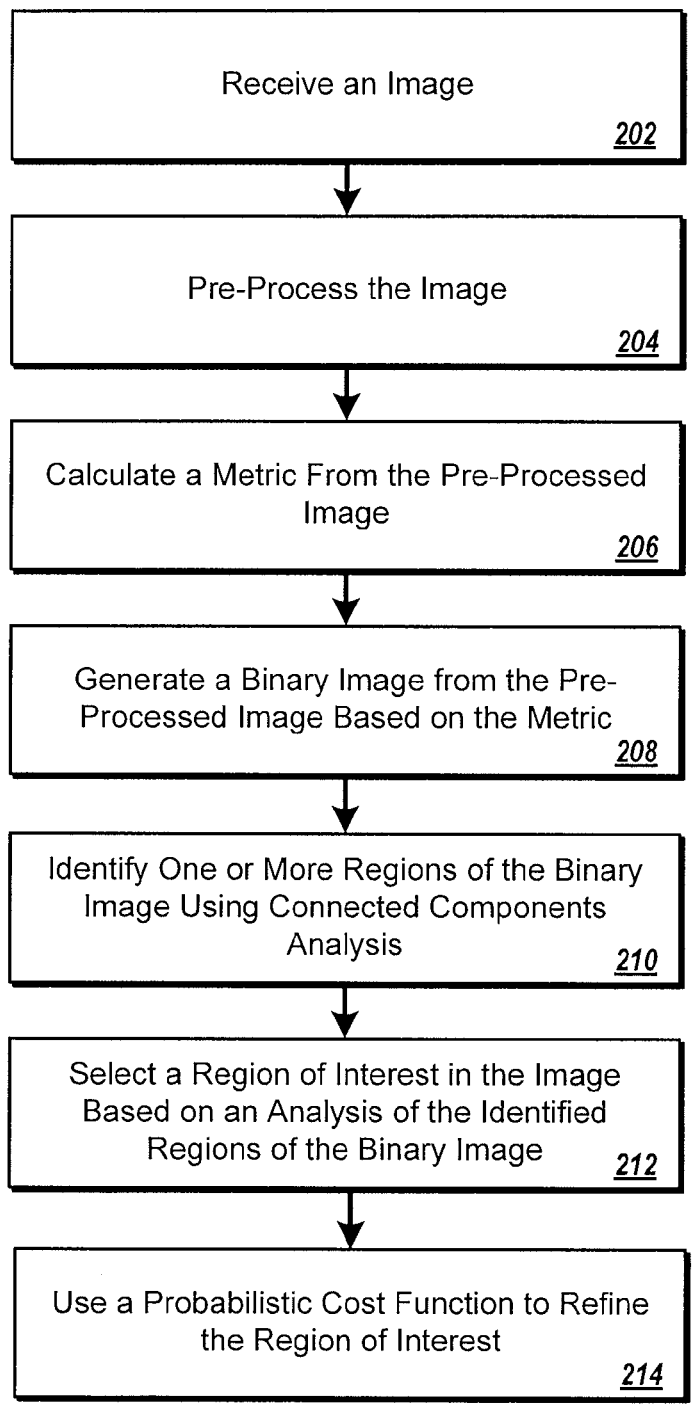
FIG. 2 illustrates an example method for selecting a region of interest in an image.

FIG. 2 illustrates an example method 200 for selecting a region of interest in an image. This method can be used to select more than one region of interest in an image.

In step 202, an image can be received. An image can be received from a variety of sources. For example, a received image can be captured by the device performing the method. The received image can be retrieved from memory, for example, at the request of a user or a process. The received image can be received directly from a user or a process. Other sources of an image and ways of receiving an image are also possible.

In step 204, the image is pre-processed. In general, pre-processing is done to accentuate a feature of the object of interest. Various types of pre-processing can be done depending on the object of interest.

For example, if the object of interest is a bar code, pre-processing can be done to accentuate the vertical lines of a bar code. In some implementations, pre-processing when the object of interest is a bar code includes applying an edge detection filter such as an image intensity gradient magnitude filter or a Roberts Cross filter to the image to accentuate the lines in the image. For example, a Sobel filter can be used to calculate the horizontal and vertical intensity gradients ($G_h$ and $G_v$) of the pixels in an image. The horizontal and vertical intensity gradients can then be converted into an intensity gradient magnitude (e.g., by calculating $\sqrt{G_h^2+G_v^2}$). Other edge detection filters can also be used.

If the object of interest is text, pre-processing can be done to accentuate curves and edges in the text, for example, by applying edge detection filters like those used for barcodes.

If the object of interest is a face, pre-processing can be done to normalize lighting conditions, for example, through the use of a homomorphic filter to remove the effect of variable lighting on a scene. Face preprocessing can also involve using a weighted masked template convolution filter to accentuate face-like structures in the image or component shapes (such as circles, curves, and lines) and their relationships to each other. For example, faces usually have two eyes (circles), one nose (line) and a mouth (curve) that have a specific relationships to each other.

Other types of pre-processing are also possible, depending on the object of interest. For example, a morphological filter (e.g., a dilation operator) can be used to accentuate certain features in the image. Image moments (e.g., weighted averages of the intensities of pixels in the regions) can also be used.

In some implementations, the image is subsampled (e.g., downsampled, when the size of the image is decreased resulting in a smaller representation of the image) before the image is pre-processed. Subsampling can be used to speed-up the subsequent processing steps by reducing the size of the image. In some implementations, subsampling includes using a filter to smooth the image. In these implementations, robustness can be improved by filtering out non-relevant image detail.

In step 206, a metric is calculated from the pre-processed image. The way the metric is calculated can be pre-specified or determined using a data-driven machine learning approach, for example, using a support vector machine. The metric specifies a metric value for each pixel in the image based on the pixel and its surrounding pixels. In some implementations, the metric specifies a high value for pixels likely to be in a region of interest and a low value for pixels not likely to be in the region of interest. The metric may depend on the object of interest.

For example, barcodes typically have high horizontal variance and low vertical variance, because they consist of a series of vertical lines. Therefore, for barcodes the metric can be calculated based on the horizontal and vertical variance of each pixel and can assign a high value to pixels with high horizontal variance and low vertical variance.

For example, when the object is a barcode, the metric value for each pixel (x,y) can be calculated according to the equation: $m(x,y)=\alpha_h v_h(x,y)-\alpha_v v_v(x,y)$, where $\alpha_h$ and $\alpha_v$ are mixing coefficients, chosen to result in empirically high metric values in areas where there is high horizontal variance and low vertical variance. The values $v_h(x,y)$ and $v_v(x,y)$ are the local horizontal and vertical variances, respectively. They can be calculated according to the equations:

$$v_h(x, y) = \frac{1}{N_h + 1} \sum_{i=-N_h/2}^{N_h} [p(x+i, y) - \mu(x, y)_h]^2$$

and $$v_v(x, y) = \frac{1}{N_v + 1} \sum_{j=-N_v/2}^{N_v} [p(x, y+j) - \mu(x, y)_v]^2.$$

$N_h$ and $N_v$ are the lengths (in pixels) of the horizontal and vertical windows over which the metric value is calculated. The precise values of $N_h$ and $N_v$ can be chosen empirically. $\mu(x,y)_h$ and $\mu(x,y)_v$ are the local horizontal and vertical means, and can be calculated according to the equations:

$$\mu(x, y)_h = \frac{1}{N_h + 1} \sum_{i=-N_h/2}^{N_h} [p(x+i, y)]$$

and $$\mu(x, y)_v = \frac{1}{N_v + 1} \sum_{j=-N_v/2}^{N_v} [p(x, y+j)].$$

In step 208, a binary image is generated from the pre-processed image based on the metric. The binary image can be generated as follows. The calculated metric value of each pixel is considered. Pixels whose metric values are above a certain threshold are assigned a value of 1, and pixels whose metric values are not above the certain threshold are assigned a value of 0. The threshold can be identified, for example, so that values within a certain percentage of possible metric values, for example, the top 25%, are included. The threshold can be determined empirically, e.g., by selecting a value that gave good performance on a set of test images (e.g., using cross validation).

In step 210, one or more connected regions in the binary image are identified using connected components analysis. The identified regions are regions of contiguous pixels whose value is 1. These regions represent potential regions of interest in the image, because they are regions whose pixels had high metric values.

Connected components analysis processes an image and identifies regions of connected elements. Two pixels are connected when they have the same or similar values and are neighbors. Pixels can be neighbors when they are 4-adjacent (e.g., one pixel is directly above, directly below, directly to the left, or directly to the right of the other pixel) or when they are 8-adjacent (e.g., one pixel is directly above, directly to the diagonal upper right, directly to the right, directly to the diagonal lower right, directly below, directly to the lower diagonal left, directly to the left, or directly to the upper diagonal left).

In step 212, a region of interest in the image is selected based on an analysis of the identified regions of the binary image. The region of interest is the region of the image most likely to contain the object of interest. In some implementations, multiple regions of interest are identified (e.g., by analyzing the identified region and selecting the regions most likely to contain the object of interest).

In various implementations, the region of interest is determined by analyzing the identified regions of the binary image, e.g., by determining characteristics such as the mass (e.g., number of pixels) in each region, the aspect ratio of each region, the shape of each region, and the image moments (e.g., weighted averages of the intensities of pixel) in each region. The details of the analysis will vary depending on what is in the region of interest. For example, the specifications for various types of barcodes include the aspect ratio for the type of barcode. Regions whose aspect ratios are not in the specified range can be filtered out when a barcode is the object of interest. Similarly, barcodes should have a convex shape, so non-convex regions can be filtered out when a barcode is the object of interest.

In step 214, the region of interest is further refined, e.g. by cropping the edges of the region of interest. The refinements can vary based on the object of interest and the purpose for the selection. Different objects of interest will require different types of cropping. For example, if the object of interest is a bar code, it may be useful to remove extra white space around the bar code. Different purposes of selection will require different amounts of cropping. For example, if a region of interest is being selected for input to a post-processor, then the requirements of the post-processor may dictate how much of the region of interest should be cropped. Generally speaking, the region of interest is further refined by using a probabilistic cost-function. The probabilistic cost-function has multiple terms that can be modified to fit the object of interest. The terms of the probabilistic cost function can be used under a Gaussian error assumption, where the individual factor variances are heuristically determined for optimal performance. The variance of each term can be used as a weighting coefficient.

For example, if the object of interest is a barcode, the region can be refined as follows. First, the center of mass of the region (e.g., the centroid, or balance point of the image) can be determined. Generally speaking, a horizontal line drawn through the center of mass will almost always bisect the barcode along its long axis. The left and right cropping points of a horizontal line drawn through the center of mass are then used to identify a crop box. A probabilistic cost function can then be applied to further refine the crop box. For example, the cost function:

$$c(x)=\exp(\delta_i p_i(x)^2)\exp(\delta_g |dp_i(x)/dx|)[1-\exp(\delta_d |x-x_c|)]$$

can be used. Here, $p_i(x)$ is the one dimensional image intensity profile of the cropped region, $dp_i(x)/dx$ is the slope of the intensity profile, $x_c$ is the horizontal position of the cropped region's center of mass, and $\delta_i$, $\delta_g$, and $\delta_d$ are mixing coefficients chosen empirically, for example, using a cross-validation method to ensure robust performance over a set of test images. The cost function can then be evaluated from $x_c$ to the left and to the right, and the first locations (e.g., one on either side of the center of mass) where a threshold is crossed can be declared as the crop points. The threshold can be determined empirically, e.g., by trying multiple potential threshold values on a set of test images and selecting the value that gives the best performance (e.g., using cross validation). Other cost functions based on different objects of interest are also envisioned.

Figure 3:
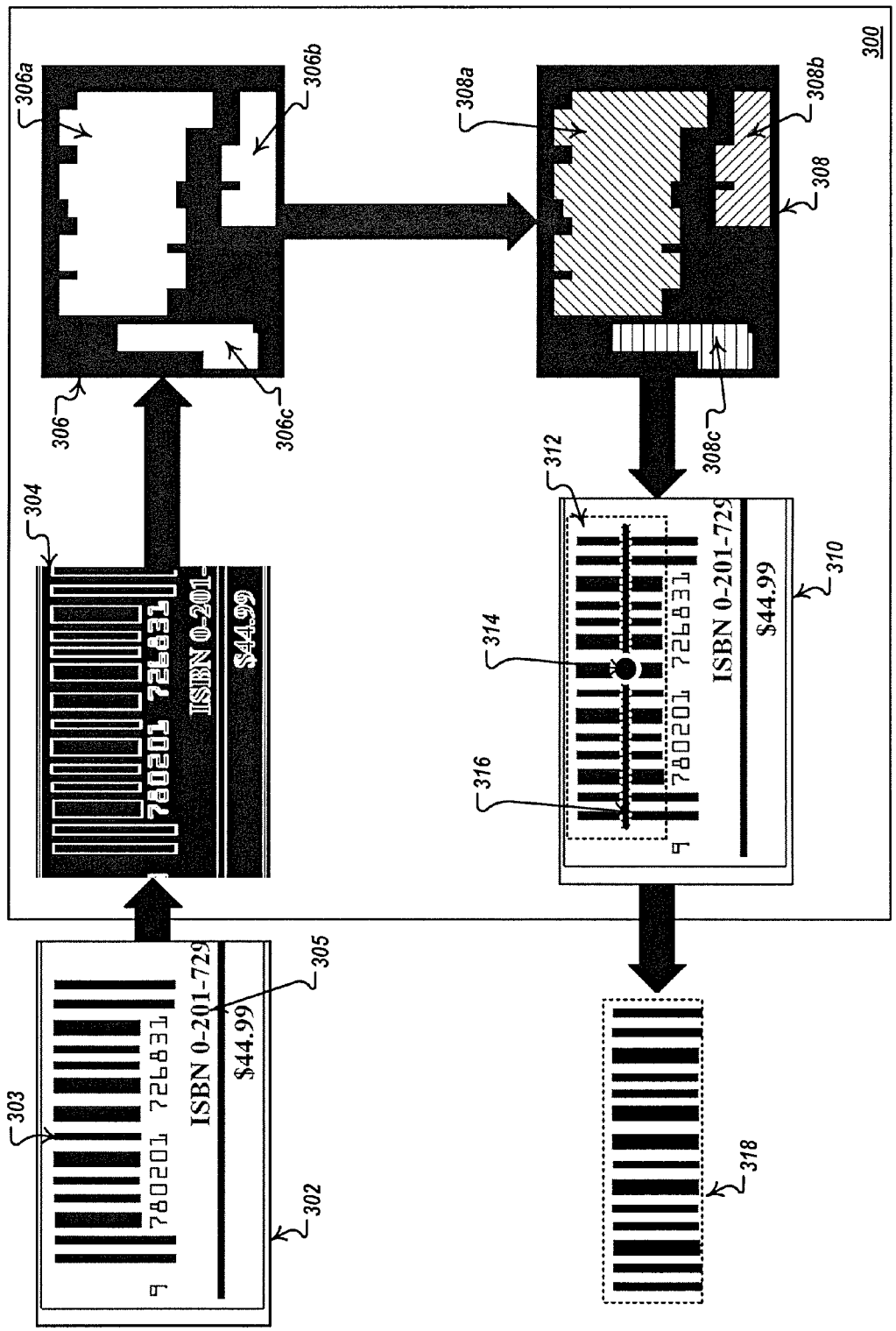
FIG. 3 illustrates an example of the method described in reference to FIG. 2, as applied to an image.

FIG. 3 illustrates an example of the method described in reference to FIG. 2, as applied to an image. In FIG. 3, the object of interest is a barcode. An image 302 is received. The image contains a number of elements including a bar code 303 and text 305.

The image is pre-processed by applying an image intensity gradient magnitude filter to detect edges in the image. This results in the pre-processed image 304. The pre-processed image 304 more clearly shows the edges that were present in the original image 302.

A metric is then calculated based on the pre-processed image 304. Because the object of interest is a barcode, the metric specifies a high value for pixels with high horizontal variance and low vertical variance.

The metric is used to generate a binary image 306 by giving pixels a value of 1 when their metric value is above a given threshold and giving pixels a value of 0 when their metric value is below a given threshold. This results in a number of regions of pixels whose value is 1 (e.g., 306a, 306b, and 306c).

Connected components analysis is used to identify several connected regions 308 in the binary image (e.g., 308a, 308b, and 308c). The connected regions are shaded differently to emphasize that they are distinct.

Each of the connected regions is analyzed for characteristics such as aspect ratio and moment of inertia. Based on this analysis, a region 312 is identified in the original image, as shown in 310. The center of mass 314 of the region and the horizontal line 316 through the center of mass can be used to further refine the region as discussed above in reference to FIG. 2. The resulting refined region 318, is then selected for further processing.

Figure 4:
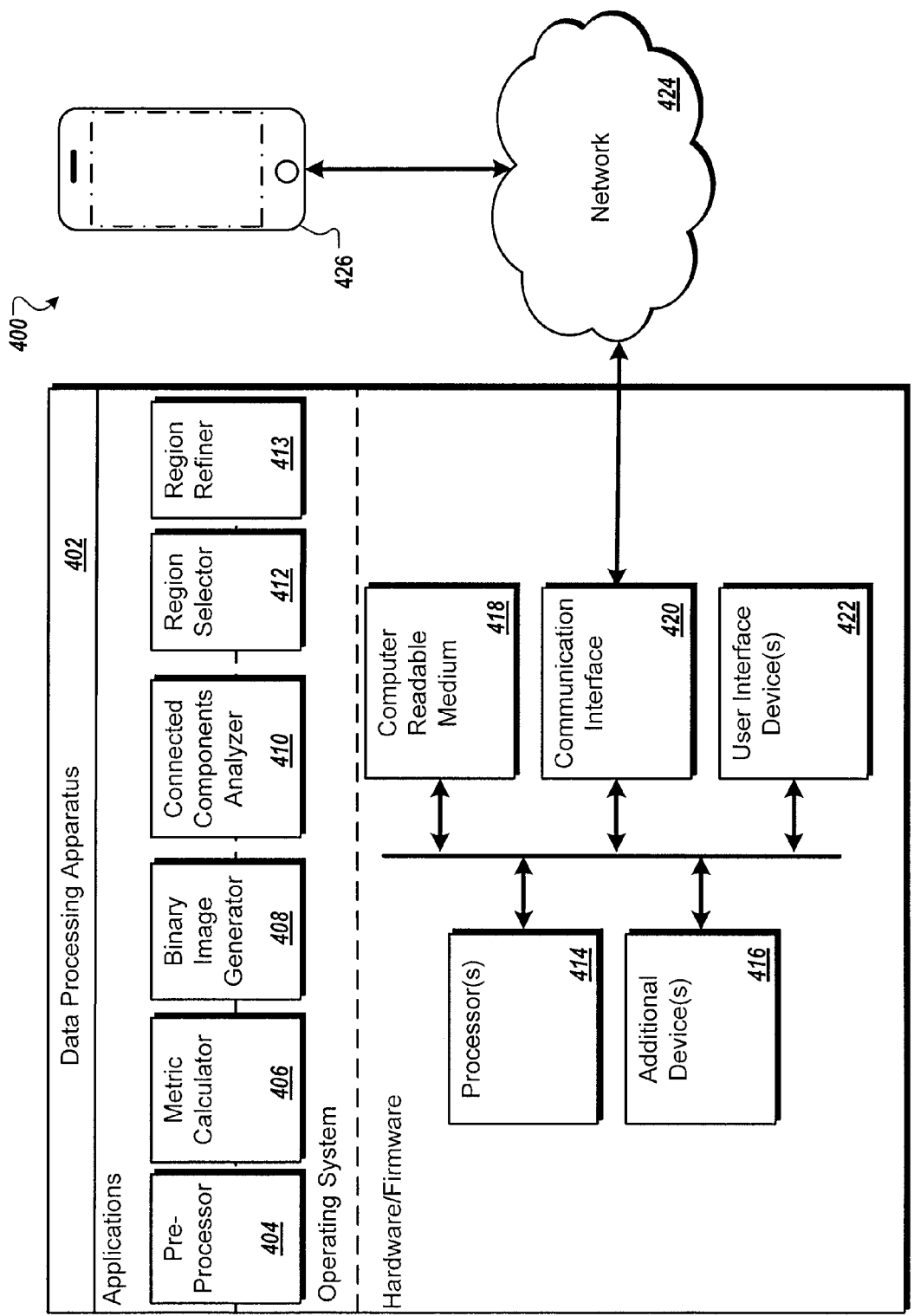
FIG. 4 illustrates an example architecture of a system for selecting a region of interest in an image.

FIG. 4 illustrates an example architecture of a system 400 for selecting a region of interest in an image. The system generally consists of a data processing apparatus 402 and one or more client devices 426. The data processing apparatus 402 and client device 426 are connected through a network 424.

While the data processing apparatus in 402 is shown as a single data processing apparatus, a plurality of data processing apparatus may be used. In some implementations, the client device 426 and the data processing apparatus 402 are the same device.

In various implementations, the data processing apparatus 402 runs a number of processes, e.g. executable software programs. In various implementations, these processes include a pre-processor 404, a metric calculator 406, a binary image generator 408, a connected components analyzer 410, a region selector 412, and a region refiner 413.

The pre-processor 404 pre-processes an image. The type of pre-processing can depend on the object of interest. For example, if the object of interest is a barcode, the pre-processor 404 can apply an edge detection filter to the image.

The metric calculator 406 calculates a metric based on the pre-processed image. The metric can assign a high value for pixels likely to be in a region of interest and a low value for pixels not likely to be in a region of interest.

The binary image generator 408 generates a binary image from a pre-processed image based on a metric. The binary image generator processes the pre-processed image and assigns a 1 to pixels whose metric value is above a given threshold and a 0 to pixels whose metric value is below a given threshold.

The connected components analyzer 410 analyzes a binary image and identifies connected regions using connected components analysis.

The region selector 412 selects a region of the image based on an analysis of the connected regions of the binary image.

The region refiner 413 refines the region of interest, for example, using a probabilistic cost function.

The data processing apparatus 402 may also have hardware or firmware devices including one or more processors 414, one or more additional devices 416, computer readable medium 418, a communication interface 420, and one or more user interface devices 422. The one or more processors 414 are capable of processing instructions for execution. In one implementation, the one or more processors 414 are single-threaded processors. In another implementation, the one or more processors 414 are multi-threaded processors. The one or more processors 414 are capable of processing instructions stored in memory or on a storage device to display graphical information for a user interface on the user interface devices 422. User interface devices 422 can include, for example, a display, a camera, a speaker, a microphone, and a tactile feedback device.

The data processing apparatus 402 communicates with client device 426 using its communication interface 420.

The client device 426 can be any data processing apparatus, for example, a camera used to capture the image, a computer, or a mobile device. In some implementations, the client device 426 sends images through the network 424 to the data processing apparatus 402 for processing. Once the data processing apparatus 402 has completed processing, it sends the selected region, or information about the selected region, such as its location in the image, back through the network 424 to the client device 426.

In some implementations, the client device 426 runs one or more of the processes 404, 406, 408, 410, and 412 instead of or in addition to the data processing apparatus 402 running the processes. For example, in some implementations, the client device runs a pre-processor, pre-processes the image, and sends the pre-processed image through the network 424 to the data processing apparatus 402.

Figure 5:
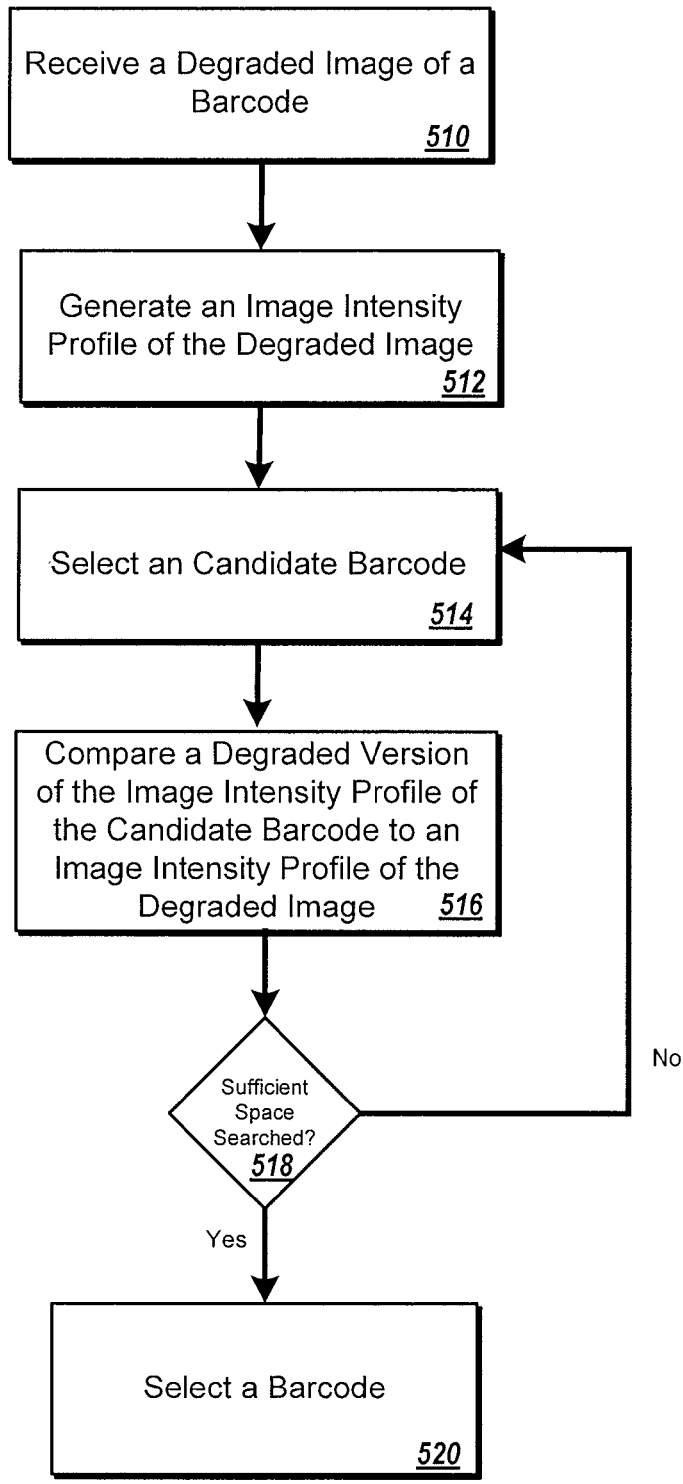
FIG. 5 illustrates an example method for searching barcodes in a population of barcodes.

FIG. 5 illustrates an example method for searching barcodes in a population of barcodes.

In step 510, a degraded image of a barcode is received. While FIG. 5 describes images of barcodes, a similar method would work with other objects of interest, such as barcodes, faces, text, or license plates. The degraded image is degraded because of, for example, blur or noise or other distortions. The degraded image can be received from a variety of sources. For example, a degraded image can be captured by the device performing the method. The degraded image can be retrieved from memory, for example, at the request of a user or a process. The degraded image can be received directly from a user or a process. The degraded image can be a region of interest identified as described above in reference to FIG. 2. Other sources of a degraded image and ways of receiving a degraded image are also possible.

In step 512, a image intensity profile for the degraded image is generated. In some implementations, an image intensity profile is generated only for a region of interest in the degraded image, rather than the entire degraded image. In some implementations, the region of interest is identified using the method described above in reference to FIG. 2. Other techniques for identifying the region of interest are possible, for example, a user can identify the region of interest. FIG. 5 describes searching image intensity profiles because image intensity profiles are a good representation of features of the barcode object of interest, e.g., vertical lines. However, other representations of image features can be used instead, depending on the object of interest.

Generally speaking, an image intensity profile of an image of a barcode can be generated by averaging, or vertically integrating, a set number of horizontal scan lines above and below a horizontal line through the barcode's center of mass.

In some implementations, before the image intensity profile of the degraded image is generated, the image is first normalized, for example, using an image normalization routine to correct for minor geometric distortions (affine transforms). A cross correlation metric can be used to determine how to adjust the image.

A population of barcodes is searched. In some implementations, the population of barcodes is finite. While FIG. 5 describes searching a population of barcodes, in some implementations, representations of the population of barcodes (e.g., an image intensity profile) can be searched. Other objects of interest, corresponding to the object in the degraded image, can also be searched.

The search proceeds as follows. In step 514, a candidate barcode is selected from the population of barcodes.

In step 516, a degraded version of an image intensity profile of the candidate barcode is compared to an image intensity profile of the degraded image.

In some implementations, the ideal image intensity profiles are generated much as the image intensity profile of the degraded image is generated. In some implementations, the ideal image intensity profiles can be generated directly from the barcodes they represent, or a representation of the barcodes they represent. Many barcodes, such as the 12 digit UPC-A and 13 digit EAN-13 barcodes provide a mapping from a sequence of digits to a black and white bar pattern as well as a simple parity checksum used to encode the last digit of the barcode. Thus, the ideal image intensity profiles can be generated by combining the ideal image intensity profiles for the vertical bars corresponding to the individual digits of a given barcode.

The degraded version of the image intensity profile of the candidate barcode can be generated by convolving the intensity profile with a blur kernel (for example, a standard blur kernel, a motion blur kernel, or any other measure of degradation in the image).

In some implementations, the blur-kernel is a predetermined blur kernel, for example, a Gaussian blur kernel or a box blur kernel.

In some implementations, the blur kernel is generated based on sensor data received from the device used to capture the image. Sensor data can include, for example, data from a proximity sensor, an ambient light sensor, or an accelerometer. For example, if accelerometer data is received from the device used to capture the image, the accelerometer data can be used to estimate motion blur based on the movement of the device that captured the image. The estimate of motion blur can then be used to generate a motion blur kernel that will mimic the motion blur.

In some implementations, the blur kernel is generated based on calibration data. Calibration data can be received, for example, from the device used to capture the degraded image or from a plurality of other devices. Calibration data can include an estimate of the blur produced by the device used to capture the image. Calibration data can be gathered from a device, for example, by having the device take pictures of known images at a known distance. The resulting images can then be compared to the images that were expected. Differences in the resulting images and the expected images can be used to estimate differences in the focus of the device, or its sensors. The blur kernel can then be generated to compensate for these differences. For example, if a device tends to take pictures that have a box blur effect, then a box blur kernel could be used. Calibration data can also be gathered by presenting a user with multiple de-blurred versions of an image and receiving data indicating the user's selection of the "best" image. The resulting selections can be used to track which blur kernels work best with a given user's device.

In some implementations, the blur kernel is generated based on data indicating the focal length of the device used to take the image. The focal length can be used to estimate the blur in the image resulting from the image being taken at the wrong distance for the focal length.

In some implementations, accelerometer data is received from the device used to capture the image and the accelerometer data is used to estimate a degree of variance from the horizontal or vertical axis at the time the degraded image was captured. This degree of variance can be used to estimate a "keystone" effect (e.g., a distortion of the image dimensions) or other geometry distortions in the image resulting from the fact the device used to capture the image was at an angle at the time the image was captured. The estimate of distortion can then be used to generate a distortion mapping which can be applied to the ideal image, for example, before the blur kernel is applied.

In some implementations, comparing the image intensity profiles includes calculating a fitness score. The fitness score measures how similar the two intensity profiles are. In some implementations, the fitness score is based on the mean square error of the two image intensity profiles. For example, the image intensity profile of the degraded image can be expressed as m. The degraded image intensity profile of the candidate barcode can be expressed as $\tilde{m}(x)=k(x)*\delta(g,x)$, where $k(x)$ is the blur kernel used to degrade the ideal image intensity profile, and $\delta(g,x)$ is the image intensity profile for a given representation of a barcode, g. The ideal image intensity profile $\delta(g,x)$ can also be expressed as the sum of several non-overlapping signals $s_{jp}$ as follows, where the barcode representation g is divided into p pieces, each with a corresponding signal $s_{jp}$ in the intensity space:

$$\sigma_g = \sum_{p=1}^{P} [s_{jp}(x), \text{ where } j = g_p].$$

Using these conventions, the mean square error can be calculated using the following equation:

$$MSE(\tilde{m}, m) = \frac{1}{N} \sum_{i=0}^{N-1} (\tilde{m}_i - m_i)^2$$

where the two image intensity profiles $\tilde{m}$ and m are signals that have been discretized on a regular grid of size N in n dimensions, and i indexes over the individual samples (e.g., pixels) so that $\tilde{m}_i$ refers to the ith sample of $\tilde{m}(x)$.

In some implementations, the representations are zero-meaned before the mean square error is calculated, in order to reduce the effect of differences in the mean values of the two image intensity profiles. For example, the zero-mean mean square error can be calculated as follows:

$$MSE(\tilde{m} - \mu_{\tilde{m}}, m - \mu_m) = \frac{1}{N} \sum_{i=0}^{N-1} [(\tilde{m}_i - \mu_{\tilde{m}}) - (m_i - \mu_m)^2]$$

$$= \frac{1}{N} \sum_{i=0}^{N-1} [(\tilde{m}_i - m_i) - \mu_{\tilde{m}-m}]^2$$

$$= \frac{1}{N} \sum_{i=0}^{N-1} (e_i - \mu_e)^2$$

$$= \text{var}(e)$$

where var(e) is the variance of the error signal $e=\tilde{m}-m$, $\mu_{\tilde{m}}$ is the mean of $\tilde{m}$, and $\mu_m$ is the mean of m.

A fitness score based on the zero-mean mean square error can be calculated as follows:

$$F(g) = \exp\left[-\frac{\text{var}(e)}{\text{var}(m)}\right] = \exp\left[-\frac{\text{var}(k*\sigma(g)-m)}{\text{var}(m)}\right].$$

The negative exponent of variance is used to convert low error values into high fitness scores and also bound the fitness score range to [0,1]. The variance of the error signal is normalized by the variance of the image intensity profile of the degraded image to make the measure less sensitive to inter-signal differences.

Figure 6A:
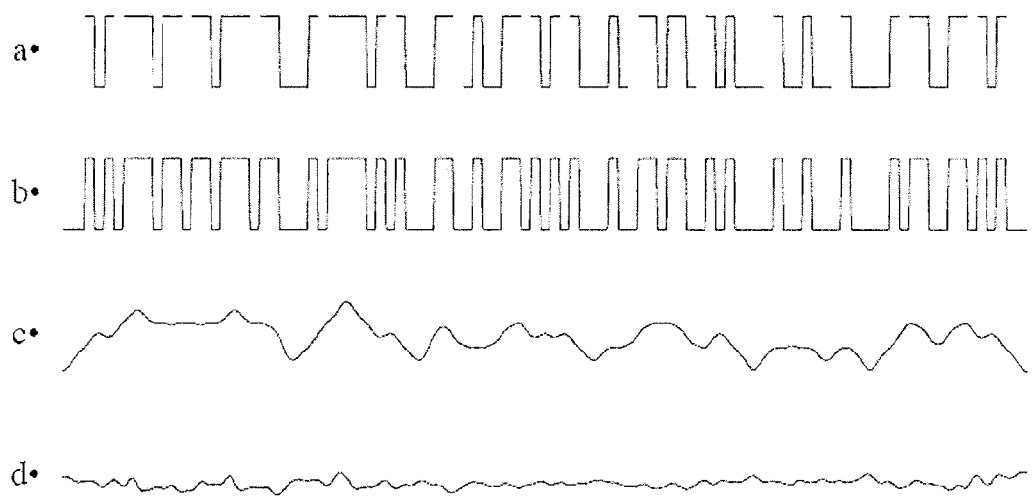
FIG. 6A illustrates an example of computing the error used in a fitness score.

FIG. 6A illustrates an example of computing the error used in a fitness score for a ideal image intensity profile corresponding to an UPC-A barcode 785342726831. In b, the image intensity profile of the candidate barcode is generated. For example, the image intensity profile of the candidate barcode can be generated by adding together the individual image intensity profiles for each number of the barcode, shown in a. In c, a degraded version of the image intensity profile of the candidate barcode is generated, for example, by convolving the ideal image intensity profile of the candidate barcode with a blur kernel. In d, the degraded version of the image intensity profile of the candidate barcode is compared with the image intensity profile of the degraded image, resulting in the error signal shown. This error signal $e=\tilde{m}-m$ is then used in the above fitness score equation.

Other scores are also envisioned. For example, the score can be a weighted combination of multiple factors. In some implementations, high scores are better. In some implementations, low scores are better.

In some implementations, various optimizations are possible based on the fact that convolution is a linear operator. For example, when the ideal image intensity profile can be divided into P parts, each corresponding to a part of the barcode representation g, the degraded version of the ideal image profile of the barcode can be expressed as follows:

$$\tilde{m}(x) = k(x) * \sigma(g, x)$$

$$= k(x) * \sum_{p=1}^{P} [s_{jp}(x), \text{ where } j = g_p]$$

$$= \sum_{p=1}^{P} [k(x) * s_{jp}(x), \text{ where } j = g_p]$$

$$= \sum_{p=1}^{P} [s'_{jp}(x), \text{ where } j = g_p]$$

$$= \sigma'(g, x).$$

In other words, the various degraded ideal image intensity profiles can be constructed at run-time by combining, e.g., overlap-adding, pre-blurred component signals s'. No convolution needs to be computed at runtime, which can result in a significantly lower computation cost.

Figure 6B:
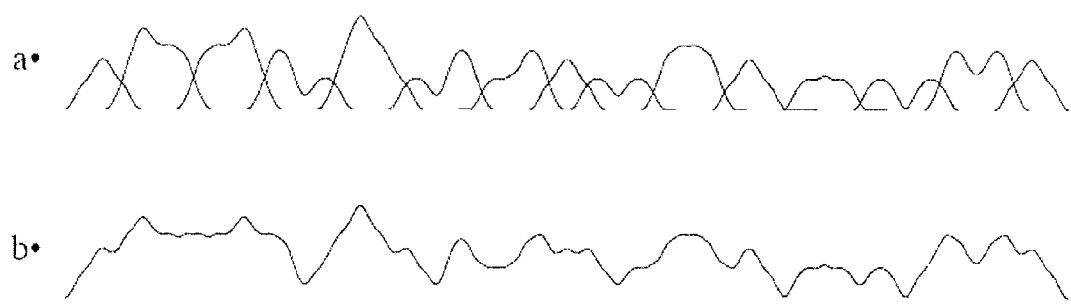
FIG. 6B illustrates an example of generating a degraded version of an ideal image intensity profile.

FIG. 6B illustrates an example of generating a degraded version of the ideal image intensity profile, $\tilde{m}$, from the individual blurred image intensity profile signals s'. The individual, overlapping, pre-computed blurred signals s' are shown in a. The result, $\tilde{m}$, of combining the pre-computed blurred signals is shown in b.

In this optimization, the error function can be determined as follows. First, the degraded version of the image intensity profile of the candidate barcode m̂(x)=δ'(g,x) is constructed by combining the pre-blurred symbols s' corresponding to the image intensity profile of the candidate barcode. Then, the resulting m̂ is used in the fitness score equation given above.

Figure 6C:
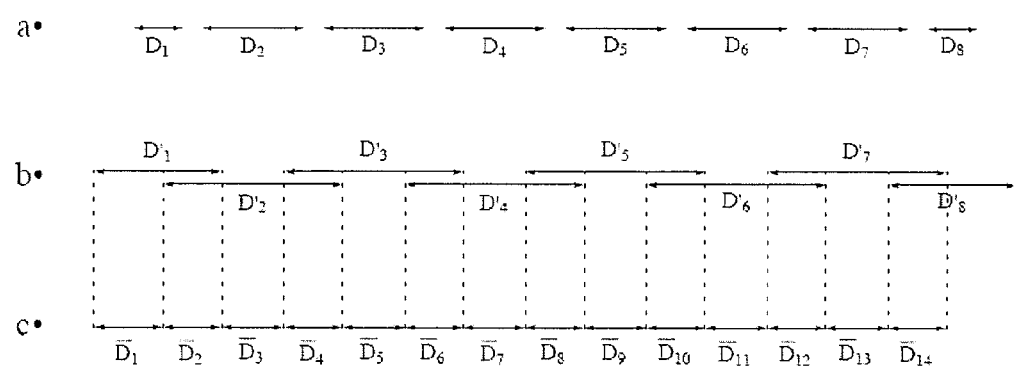
FIG. 6C illustrates an example of how the image space can be divided.

An alternative optimization is to construct the error signal directly by storing all possible segments of the error signal (e.g., corresponding to all of the ways a part of the image intensity profile of the degraded image is subtracted from a portion of the degraded image intensity profile of the candidate barcode). FIG. 6C illustrates an example of how a signal space corresponding to an image intensity profile can be divided. The division shown in a is the initial division of the signal space described above, where each $D_i$ corresponds to a part of the ideal image intensity profile of the candidate barcode. The division as shown in b is the division after the parts of the ideal image intensity profile of the candidate barcode are degraded. Each $D'_j$ corresponds to a degraded version of part of the ideal image intensity profile of the candidate barcode, e.g., each $D'_j$ corresponds to one of the numbers in the candidate barcode. The regions in b overlap as a result of the degradation of the ideal signal. The regions can be further divided into Q sub-regions $\overline{D}_q$ that do not overlap (e.g., any given two pixels are in the same subregion only if the set of regions in D' that include one of the pixels is the same set of regions in D' that include the other pixel), as shown in c. Some of the subregions may have degraded image intensity profile signals corresponding to one part of the ideal image intensity profile, and some of the subregions may include signals corresponding to multiple parts of the ideal image intensity profile. For example, the signals in $\overline{D}_1$ are based only on the signal corresponding to $D'_1$, while the signals in $\overline{D}_2$ are based on signals corresponding to $D'_1$ and $D'_2$. Each sub-region $\overline{D}_q$ of the degraded image intensity profile can contain one of a finite number of signals, e.g., a finite number of combinations of all possible overlapping signals that can occur in that region. Each signal represents a part of one or more of the degraded ideal image intensity profiles.

Information about the error signal in each region $\overline{D}_q$ can then be computed, based on the following equations:

$$e_{kq} = \sum_{i \in \overline{D}_q} (\bar{s}'_{lq,i} - m_i)$$

$$E_{kq} = \sum_{i \in \overline{D}_q} (\bar{s}'_{lq,i} - m_i)^2,$$

where $\bar{s}'_{lq}$ is one of the possible degraded signals in a given region $\overline{D}_q$, the l is the part of the barcode representation g corresponding to the region q in $\overline{D}_q$, and $\bar{s}_{lq,i}$ and $m_i$ represent the values of $\bar{s}_{lq}$ and m, respectively, for a given pixel i.

Because the variance of a signal s can be expressed as:

$$\mathrm{var}(s) = \frac{1}{N_D} \sum_{i=0}^{N_D-1} s_i^2 - \left(\frac{1}{N_D} \sum_{i=0}^{N_D-1} s_i\right)^2,$$

it follows that the fitness score can be calculated as follows:

$$F(g) = \mathrm{var}[\sigma'(g) - m]$$

$$= \frac{1}{N_D} \sum_{i=0}^{N_D-1} (\sigma'(g)_i - m_i)^2 - \left(\frac{1}{N_D} \sum_{i=0}^{N_D-1} (\sigma'(g)_i - m_i)\right)^2,$$

where $N_D$ is the size of the region being considered, and for any given pixel i, the value of $\delta'(g)_i$ is equal to the value of $\bar{s}_{lq,i}$. The pre-computed values $e_{kq}$ and $E_{kq}$ can therefore be plugged into the variance equation, giving a fitness score as follows:

$$F(g) = \frac{1}{N_D} \sum_{q=1}^{Q} E_{lq} - \left(\frac{1}{N_D} \sum_{q=1}^{Q} e_{lq}\right)^2.$$

By pre-computing $E_{lq}$ and $e_{lq}$ for all possible signals in each region $\overline{D}_q$, the number of computations required at runtime can be significantly decreased.

In step 518, a check is done to see if a sufficient search space has been searched. If not, the search continues. What constitutes a sufficient search space can vary depending on the implementation. In some implementations, steps 512-516 are repeated for each barcode in the population of barcodes, and thus the sufficient search space is the entire population of barcodes. In some implementations, a sufficient space has been searched once a candidate barcode whose degraded image intensity profile is sufficiently close to the image intensity profile of the blurred image is identified. In some implementations, a sufficient space has been searched once a certain number of barcodes (for example, 100) have been considered.

In some implementations, a genetic algorithm is used to direct the search. A genetic algorithm begins by selecting a sub-population of barcodes from an overall population of barcodes. Each member of the sub-population of barcodes is scored according to a fitness function. The scores of the sub-population members are used to determine how a new sub-population of images should be generated, by keeping, mutating, and combining ("breeding") members of the sub-population. In some implementations, the search stops once a barcode with an acceptable fitness score is identified. In some implementations, the search stops once a certain number of iterations have completed. For example, once new populations have been bred 100 times, the search can stop. In some implementations, the search stops once the genetic algorithm converges to a local minimum or maximum and the genetic algorithm cannot move past the local minimum or maximum. Other termination points are also possible.

In some implementations, context information about the degraded image is received, and the search is biased based on the context information. The context information can be used to bias the search in several ways. For example, the context information can be used to aid in the selection of a candidate barcode in step 514 or the context information can be used to affect which barcode is selected in step 520. If a genetic algorithm is used to direct the search, the context information can be used to select the initial sub-population or to influence how the new sub-population is generated.

In some implementations, the context information includes an approximation of a physical location corresponding to where the degraded image was captured. The physical location can be received, for example, from the device used to capture the image, or can be part of the metadata of the image. The physical location can be, for example, latitude and longitude information or elevation information. The physical location can also be an address, a country, or a zip code. Location information can be used in a variety of ways. For example, most barcodes start with a country code. Therefore, candidate barcodes can be chosen for consideration based on the location where the image was captured, e.g. by selecting barcodes whose country code matches the location where the image was captured.

In some implementations, the context information includes previous selections of one or more barcodes corresponding to one or more other degraded images captured at one or more physical locations that are approximately the same as a physical location where the degraded image was captured. Previous selections can be used, for example, to detect patterns in what types of images are taken in this physical location. For example, if the blurred image contains a barcode and several images taken from the location corresponded to barcodes for books, the search could be biased to first consider images of barcodes for books (e.g., ISBN barcodes).

In some implementations, the context information is from a data processing apparatus associated with one or more objects in a vicinity of where the degraded image was captured. For example, if a picture of a barcode is taken inside a bookstore, a computer in the bookstore could provide context information, such as its catalog of books, to help with the search. The search could then first consider barcodes for books in the store.

In some implementations, the degraded image is from a video, and the context information includes the video. The additional frames in the video can be used to narrow the search, for example, by providing additional images that are similar to the degraded image, or by providing information on how the device was moving at the time the image was captured.

In some implementations, the context information is received from a user. For example, a user could specify key words to narrow the search by indicating that the image is a barcode of a music CD. The search could then begin with barcodes corresponding to music CDs. In some implementations, the context information includes sounds. For example, a user could speak words or phrases, a device could process them, and the device could use the processed words or phrases to narrow the search.

In step 520, a barcode is selected. The barcode can be selected based on the comparisons made during the search of the population of barcodes. The barcode can be selected, for example, by selecting the barcode whose degraded image intensity profile is the closest to the image intensity profile of the degraded image, e.g., whose score is the best. The selected barcode is a non-degraded version of the barcode in the image.

In some implementations, once the barcode is selected, it is used to generate a non-degraded version of the degraded image, for example, by replacing the barcode pictured in the image with the selected barcode.

In some implementations, once the barcode is identified, it is used to retrieve information based on the non-degraded image. For example, information about the item associated with that barcode can be retrieved (e.g., from a barcode database). This information can then be displayed to a user or passed to other processes.

Figure 7:
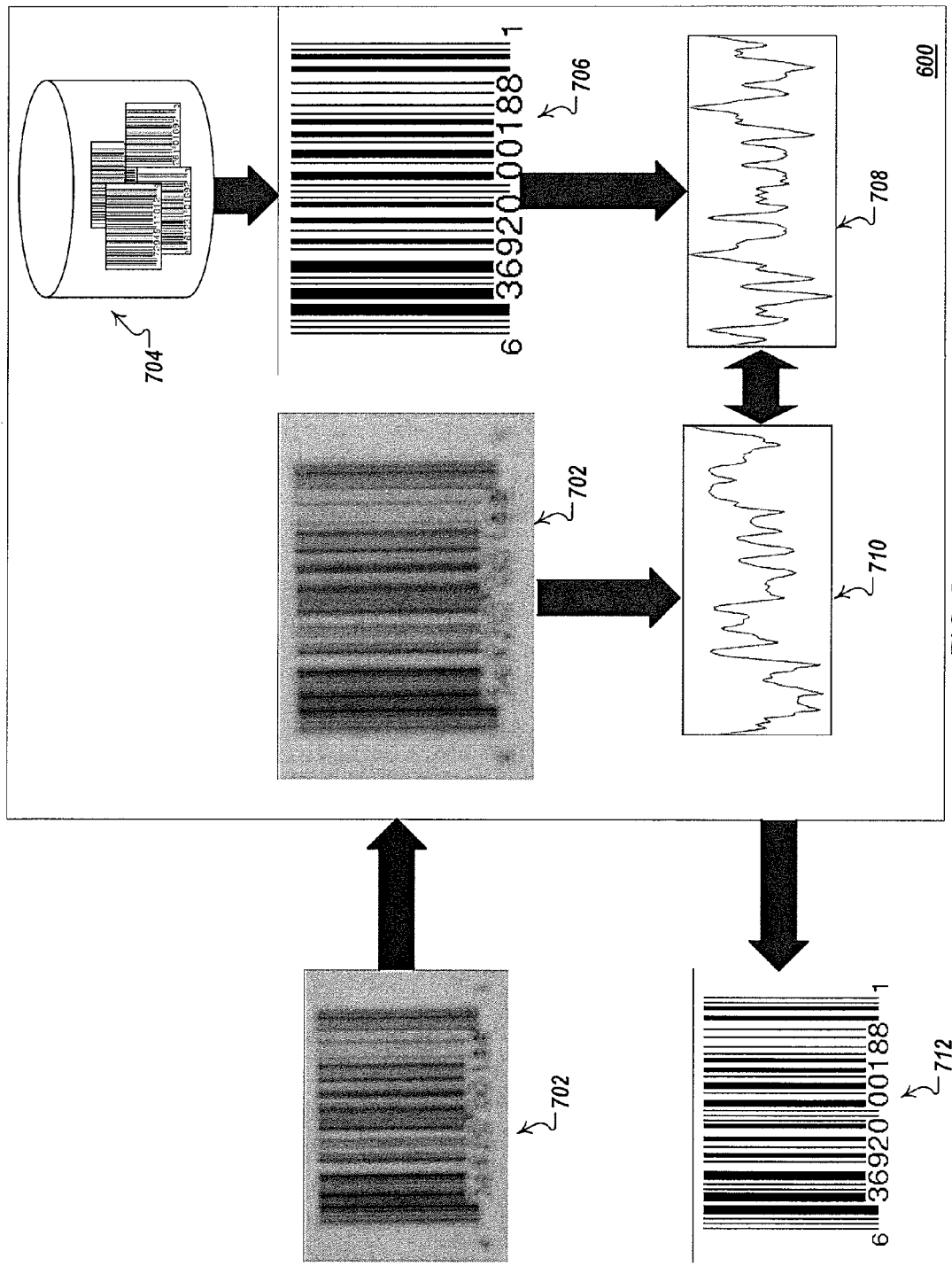
FIG. 7 illustrates an example of the method described in reference to FIG. 5, as applied to an image of a barcode.

FIG. 7 illustrates an example of the method described in reference to FIG. 5, as applied to an image of a barcode. A degraded image 702 is passed to the method 700. An image intensity profile 710 of the degraded image 702 is generated. A population of barcodes is searched by selecting a barcode 706 from a population of barcodes 704, generating the image intensity profile from the selected barcode 706, generating a degraded version 708 of the ideal intensity profile (e.g., by convolving the ideal image intensity profile with a blur kernel), and comparing the degraded version 708 of the ideal image intensity profile with the image intensity profile 710 of the degraded image 702. The comparison results in a fitness score. The search continues until a sufficiently good match has been identified, and the selected barcode 712 is returned.

Figure 8:
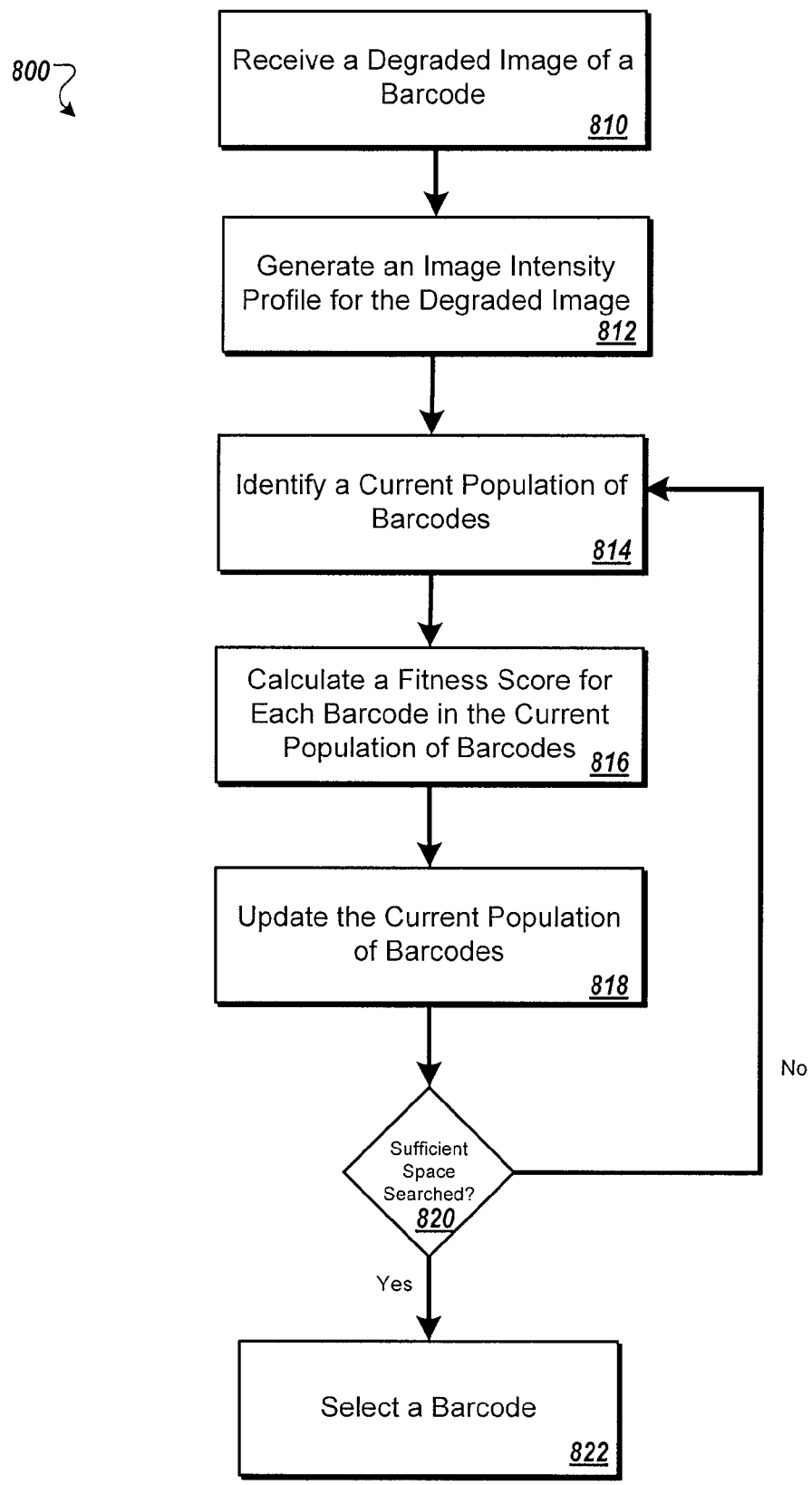
FIG. 8 illustrates an example method for selecting a barcode using a genetic algorithm.

FIG. 8 illustrates an example method for selecting a barcode using a genetic algorithm.

In step 810, a degraded image of a barcode is received. The degraded image is degraded because of, for example, blur or noise or other distortions. The degraded image can be received from a variety of sources. For example, a degraded image can be captured by the device performing the method. The degraded image can be retrieved from memory, for example, at the request of a user or a process. The degraded image can be received directly from a user or a process. The degraded image can be a region of interest identified as described above in reference to FIG. 2. Other sources of a degraded image and ways of receiving a degraded image are also possible.

In step 812, an image intensity profile is generated for the degraded image. The image intensity profile can be generated as described above in reference to FIG. 5.

A population of barcodes is searched using a genetic algorithm. In some implementations, the population of barcodes is finite.

The search proceeds as follows. In step 814, a current population of barcodes is identified. Each member of the current population of barcodes can be represented by a genome corresponding to the barcode. For example, the genome can be a vector of elements, where each element of the vector corresponds to part of the barcode. The genome can also be represented as a number.

In some implementations, the current population of barcodes is identified (e.g., initialized) using traditional genetic algorithm techniques, such as randomly selecting a current population of barcodes from the entire population of barcodes.

In some implementations, the current population of barcodes is identified (e.g., initialized) using a greedy initialization protocol. The greedy initialization protocol identifies a current population of barcodes whose images are similar to that of the degraded image. Generally speaking, the greedy initialization protocol does a series of local optimizations for subparts of barcode genomes (e.g., by modifying the subparts until a score comparing the resulting barcode stops increasing). These subparts are then concatenated.

In step 816, a fitness score is calculated for each image corresponding to each barcode in the current population of barcodes. Generally speaking, a fitness score is an estimate of how close an image of a given barcode is to the degraded image of a barcode. The fitness score for a given candidate barcode is calculated based on a comparison of a degraded version of the ideal image intensity profile of the candidate barcode and an image intensity profile of the degraded image.

The degraded version of the ideal image intensity profile and the fitness score can be determined as described above in reference to FIG. 5.

In step 818, the current population of barcodes is updated using genetic algorithm techniques based on the calculated fitness scores. In some implementations, the updated population of barcodes is bred from the current population using crossover, where two barcodes are combined to generate a new barcode by selecting one or more points on their respective genomes to splice the two genomes together. The resulting genome corresponds to a new barcode. In some implementations, the barcodes that are combined are chosen because they have good fitness function scores. In some implementations, some of the members of the updated population are generated based on inversion, where part of a genome in the current population is reversed. In some implementations, high-scoring barcodes from the current population are left in the updated population. In some implementations, the updated population of barcodes is mutated, where numbers in one or more genomes are randomly changed. Mutation can result in invalid genomes (e.g., genomes that do not correspond to valid barcodes). In some implementations, invalid genomes are automatically rejected. In some implementations, invalid genomes are kept in the population to be used for breeding subsequent generations. This is because the route from one genome to an even better genome can pass through an invalid genome. Keeping invalid genomes around for breeding purposes can add robustness and allow escape from local minima. Other methods of breeding and mutating are also possible.

The searching is repeated until a determination is made at step 820 that a sufficient search space has been searched. In some implementations, the searching stops once a barcode with an acceptable fitness score is identified. In some implementations, the searching stops after a set number of cycles of the algorithm. For example, once new populations have been bred 100 times, the search can terminate. In some implementations, the search stops when the genetic algorithm converges to a local minimum and the genetic algorithm cannot move past the local minimum. Other methods of determining that a sufficient space has been searched are also possible.

In some implementations, the genetic algorithm can become stuck at a local minimum in the error space, e.g., when the fitness function scores of the genomes are not improving. This can be detected when the best fitness score does not improve after a number of generations. In these implementations, various steps can be taken to move the algorithm beyond the local minimum. For example, random genomes can be introduced into the population. Other techniques such as accelerating the mutation of the genomes, aborting the genetic algorithm early and re-starting it with a newly initialized population, and restarting the algorithm with a randomized population can also be used.

In step 822, a barcode is selected from the population of barcodes. The selection is based on the calculated fitness scores, e.g., the barcode with the highest calculated fitness score is selected.

In some implementations, once the barcode is selected, it is used to retrieve information. For example, if the non-degraded image is of a barcode, information about the item coded with that barcode can be retrieved (e.g., from a barcode database). This information can then be displayed to a user or passed to other processes.

Figure 9:
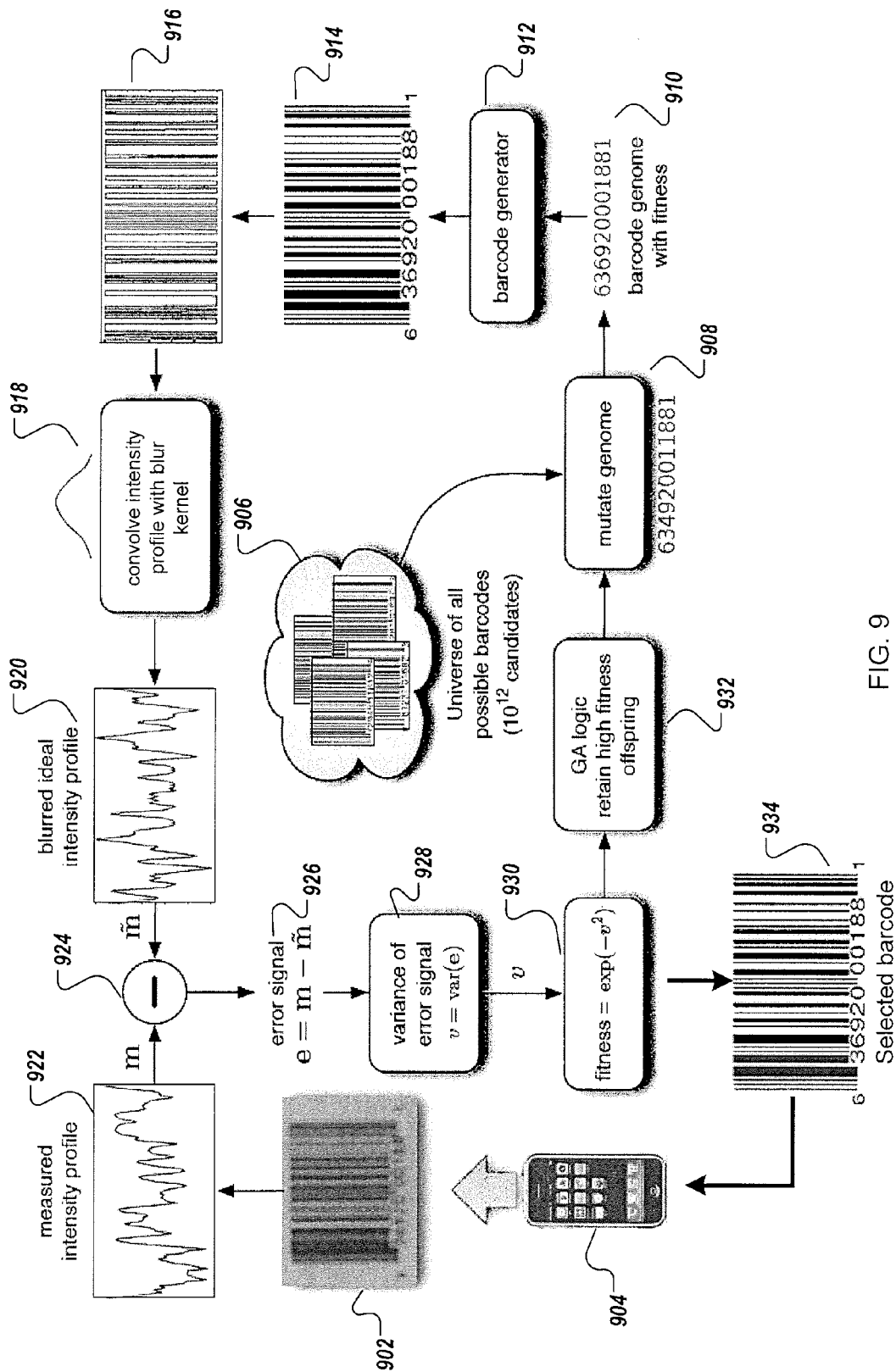
FIG. 9 illustrates an example of the method described in reference to FIG. 8.

FIG. 9 illustrates the method described above in reference to FIG. 8.

A degraded image 902 of a barcode is received from a client device 904. An initial population is generated from the universe of all possible barcodes 906, which may involve mutating one or more of the barcode genomes at 908. Then, for each barcode in the population, 910, a barcode generator 912 is used to generate an image of a barcode 914 that corresponds to the barcode genome. The image of the barcode is an ideal, non-degraded image. The image of the barcode 914 is then translated to an intensity profile 916. The intensity profile 916 is then convolved with a blur kernel at 918 resulting in a blurred ideal intensity profile 920. The generation of an intensity profile and convolution with the blur kernel can be done in one step. The blurred ideal intensity profile 920 is a degraded representation of the barcode 914. The blurred ideal intensity profile 920 is compared with the image intensity profile 922 of the blurred image 902 at 924 by computing an error signal at 926, calculating the variance of the error signal at 928, and calculating a fitness score at 930. At 932, the genetic algorithm retains high fitness offspring and creates a new population based on breeding the genomes, mutating the genomes, and selecting new genomes from the universe of all possible barcodes. The process continues until a sufficiently high-scoring barcode is identified. At that point, the barcode is selected at 934 and returned to the client device 904.

Figure 10:
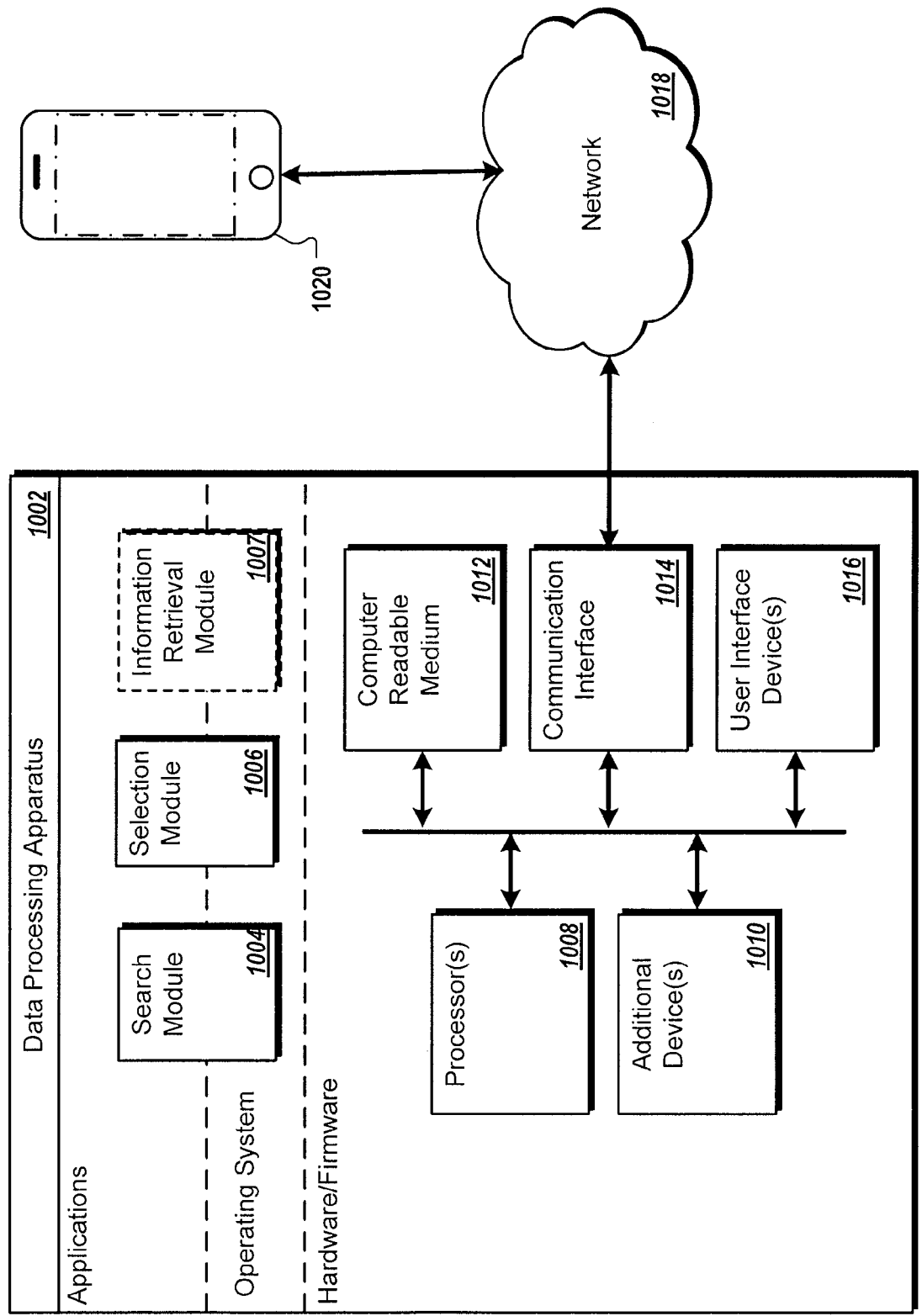
FIG. 10 illustrates an example architecture of a system for searching barcodes and selecting barcodes.

FIG. 10 illustrates an example architecture of a system 1000 for searching barcodes. The system generally consists of a data processing apparatus 1002 and one or more client devices 1020. The data processing apparatus 1002 and client device 1020 are connected through a network 1018.

While the data processing apparatus in 1002 is shown as a single data processing apparatus, a plurality of data processing apparatus may be used. In some implementations, the client device 1020 and the data processing apparatus 1002 are the same device.

In various implementations, the data processing apparatus 1002 runs a number of processes, e.g. executable software programs. In various implementations, these processes include a search module 1004, a selection module 1006, and a retrieval module 1007.

The search module 1004 searches a population of barcodes, for example, as described above in reference to FIGS. 5 and 8. The search can be directed in a number of ways, including considering all barcodes in the population or using a genetic algorithm to direct the search. The search module identifies one or more candidate barcodes and compares a degraded version of each candidate barcode's ideal image intensity profile with the image intensity profile of the degraded image. In some implementations, the search module uses a pre-determined blur kernel. In some implementations, the search module determines a blur kernel, for example, using sensor data, calibration data, or focal length data. In some implementations, the search module receives a blur kernel from another process.

The selection module 1006 selects a barcode based on the comparisons done by the search module 1004. In some implementations, the selection module selects the barcode with the highest score. The selection module 1006 can also identify the image corresponding to the selected barcode.

In some implementations, the data processing apparatus 1002 also runs an optional information retrieval module 1007 that retrieves information (for example, from a database) about the selected image.

The data processing apparatus 1002 may also have hardware or firmware devices including one or more processors 1008, one or more additional devices 1010, computer readable medium 1012, a communication interface 1014, and one or more user interface devices 1016. The processors 1008 are capable of processing instructions for execution. In one implementation, the processor 1008 is a single-threaded processor. In another implementation, the processor 1008 is a multi-threaded processor. The processor 1008 is capable of processing instructions stored in memory or on a storage device to display graphical information for a user interface on the user interface devices 1016. User interface devices 1016 can include, for example, a display, a camera, a speaker, a microphone, and a tactile feedback device.

The data processing apparatus 1002 communicates with client device 1020 using its communication interface 1014.

The client device 1020 can be any data processing apparatus, for example, a camera used to capture the image, a computer, or a mobile device. In some implementations, the client device 1020 sends images through the network 1018 to the data processing apparatus 1002 for processing. Once the data processing apparatus 1002 has completed processing, it sends the resulting image and/or information back through the network 1018 to the client device 1020. In some implementations, the client device 1020 runs one or more of the processes 1004, 1006, and 1007 instead of or in addition to the data processing apparatus 1002.

Figure 11:
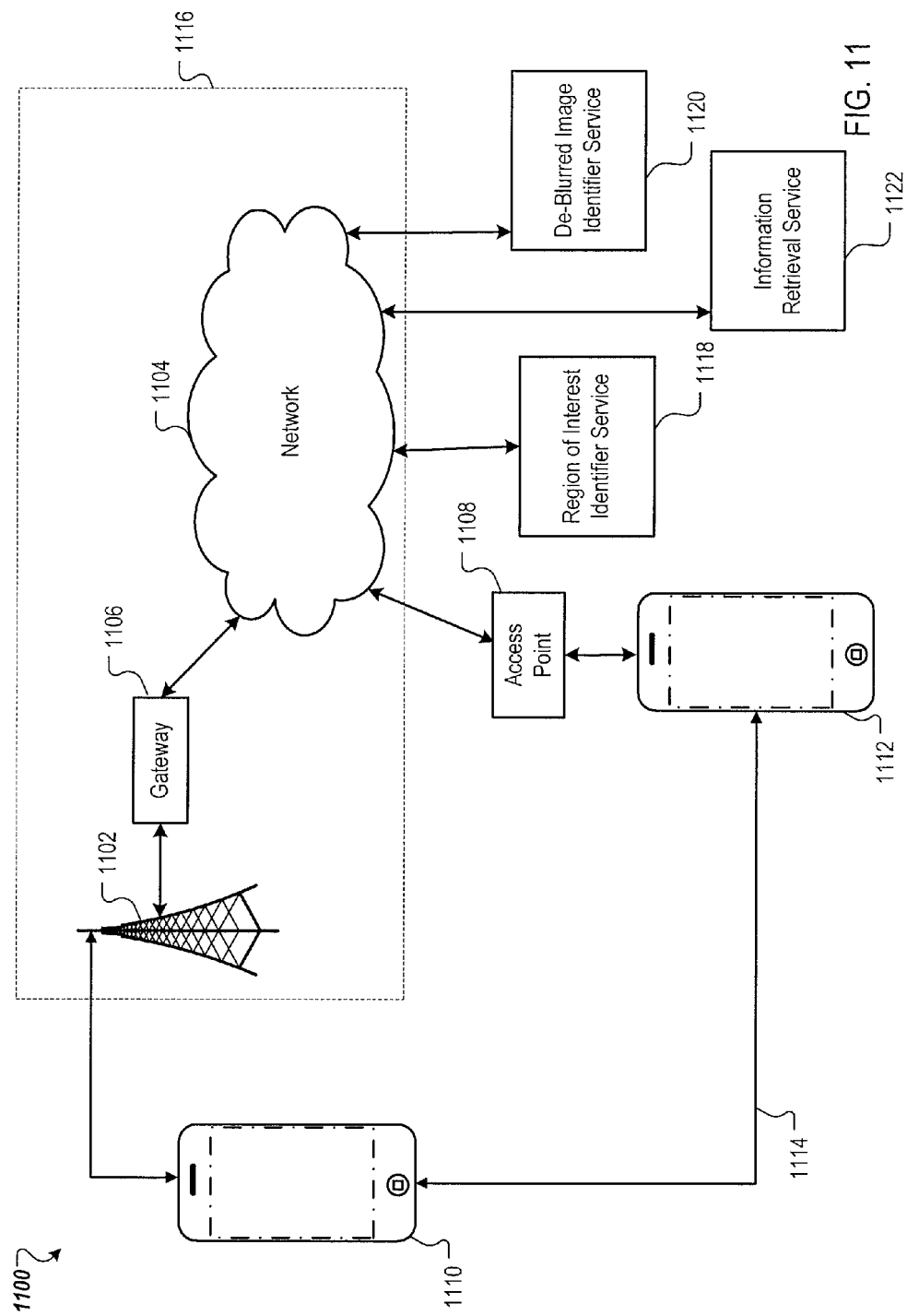
FIG. 11 illustrates an example network operating environment for a client device.

FIG. 11 illustrates an example network operating environment 1100 for a client device. The client device can, for example, communicate over one or more wired and/or wireless networks. For example, a wireless network 1102, e.g., a cellular network, can communicate with another network 1104, such as the Internet, by use of a gateway 1106. Likewise, an access point 1108, such as an 802.11g wireless access point, can provide communication access to the network 1104. In some implementations, both voice and data communications can be established over the wireless network 1102 and the access point 1108. For example, the client device 1110 can place and receive phone calls (e.g., using VoIP protocols), send and receive e-mail messages (e.g., using POP3 protocol), and retrieve electronic documents and/or streams, such as web pages, photographs, and videos, over the wireless network 1102, gateway 1106, and network 1104 (e.g., using TCP/IP or UDP protocols). Likewise, the client device 1112 can place and receive phone calls, send and receive e-mail messages, and retrieve electronic documents over the access point 1108 and the network 1104. In some implementations, the client device 1112 can be physically connected to the access point 1108 using one or more cables and the access point 1108 can be a personal computer. In this configuration, the client device 1112 can be referred to as a "tethered" device.

The client devices 1110 and 1112 can also establish communications by other means. For example, the client device 1110 can communicate with other client devices, e.g., other wireless devices, cell phones, etc., over the wireless network 1102. Likewise, the client devices 1110 and 1112 can establish peer-to-peer communications 1114, e.g., a personal area network, by use of one or more communication subsystems, such as a Bluetooth™ communication device. Other communication protocols and topologies can also be implemented.

The client devices 1110 and 1112 can, for example, communicate with one or more services over the one or more wired and/or wireless networks 1116. For example, a region of interest identifier service 1118 can receive an image from a user and automatically determine a region of interest in the image. A de-blurred image identifier service 1120 can receive an image from a user, search a set of candidate barcodes, and provide one or more de-blurred candidate images corresponding to the blurred image to the user. In some implementations, the de-blurred image identifier service 1120 generates multiple substantially de-blurred versions of the image and provides them to the user. The user then selects one of the images, and the selection information is sent back to the image de-blur service 1120 for later use, for example, as calibration data. An information retrieval service 1122 can receive a degraded image of a barcode from a user, identify a barcode corresponding to the degraded image, and then present information to the user based on the identified barcode.

The client devices 1110 and 1112 can also access and send other data and content over the one or more wired and/or wireless networks 1116. For example, content publishers such as news sites, RSS feeds, web sites, blogs, social networking sites, developer networks, etc., can be accessed by the client devices 1110 and 1112.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, e.g., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal), that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code).

The processes and logic flows described in this specification can be preformed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube), LCD (liquid crystal display) monitor, touch sensitive device or display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the flow diagrams depicted in the figures do not require the particular order shown, or sequential order, to achieve desirable results. In addition, other steps may be provided, or steps may be eliminated, from the described flow diagrams, and other components may be added to, or removed from, the described systems. Accordingly, various modifications may be made to the disclosed implementations and still be within the scope of the following claims.

What is claimed is:

1. A computer implemented method, comprising:
 receiving a degraded image of a first object of interest;
 determining, in a computer, a representation of a feature of the degraded image;
 searching a population of objects using a genetic algorithm, where the genetic algorithm includes using the computer to calculate a fitness score for a candidate object using a fitness function that compares the representation of the feature of the degraded image to a degraded representation of a feature of a non-degraded image of the candidate object; and
 selecting a second object of interest corresponding to the first object of interest as a result of the searching.

2. The method of claim 1, further comprising:
 identifying a region of interest in the degraded image, where the region of interest contains the first object of interest; and
 wherein determining the representation of the feature of the degraded image includes determining a representation of a feature of the region of interest.

3. The method of claim 1, further comprising:
 receiving context information about the degraded image; and
 wherein the searching is biased based on the context information.

4. The method of claim 1, further comprising:
 receiving data for the device used to capture the degraded image;
 generating, in the computer, a blur kernel corresponding to the degraded image using the received data; and
 determining the degraded representation of the feature of the non-degraded image of the candidate object using the blur kernel.

5. The method of claim 4, wherein:
 the data is accelerometer data for the device; and
 the blur kernel is a motion blur kernel.

6. The method of claim 5, wherein the data is calibration data.

7. A computer implemented method, comprising:
 receiving a degraded image of a first object of interest;
 determining, in a computer, a representation of a feature of the degraded image;
 searching a population of objects, the searching including identifying a current population of candidate objects and repeating the following one or more times in the computer:
  for each candidate object in the current population:
   determining a degraded representation of a feature of a non-degraded image of the candidate object; and
   calculating a fitness score comparing the degraded representation to the representation of the feature of the degraded image; and
  updating the current population using the calculated fitness score for each candidate object; and selecting a second object of interest corresponding to the first object of interest from the population of objects based on the calculated fitness scores.

8. The method of claim 7, further comprising:
identifying a region of interest in the degraded image, where the region of interest contains the first object of interest; and
wherein determining the representation of the feature of the degraded image includes determining a representation of a feature of the region of interest.

9. The method of claim 7, further comprising:
receiving context information about the degraded image; and
using the context information when identifying the current population of candidate objects.

10. The method of claim 7, further comprising:
receiving accelerometer data regarding a device used to capture the degraded image;
estimating a motion blur in the degraded image using the accelerometer data; and
determining the degraded representation of the feature of the non-degraded image of the candidate object using the estimated motion blur.

11. The method of claim 7, further comprising:
receiving calibration information; and
determining the degraded representation of the feature of the non-degraded image of the candidate object using the calibration information.

12. A computer implemented method, comprising:
receiving a degraded image of a first object of interest;
pre-processing the degraded image using a computer, resulting in a pre-processed image;
calculating, in the computer, a metric based on the pre-processed image;
generating, in the computer, a binary image from the pre-processed image based on the metric;
identifying one or more regions of the binary image using connected components analysis;
selecting a region of interest in the degraded image based on an analysis of the identified regions of the binary image, where the region of interest includes the first object of interest;
generating, in the computer, a representation of a feature of the refined region of interest;
searching a population of objects, the searching including identifying a current population of candidate objects and repeating the following steps one or more times in the computer:
for each candidate object in the current population:
determining a degraded representation of a feature of a non-degraded image of the candidate object; and
calculating a fitness score comparing the degraded representation to the representation of the feature of the degraded image; and
updating the current population using the calculated fitness scores; and
selecting a second object of interest corresponding to the first object of interest from the population of objects based on the calculated fitness scores.

13. The computer implemented method of claim 12, further comprising using a probabilistic cost function to refine the region of interest.

14. The method of claim 12, further comprising:
receiving context information about the degraded image; and
wherein the searching is biased based on the context information.

15. A system, comprising:
a processor; and
a computer-readable medium coupled to the processor and including instructions, which, when executed by the processor, causes the processor to perform operations comprising:
receiving a degraded image of a first object of interest from a client device;
determining a representation of a feature of the degraded image;
searching a population of objects using a genetic algorithm, where the genetic algorithm includes calculating a fitness score for a candidate object using a fitness function that compares the representation of the feature of the degraded image to a degraded representation of a feature of a non-degraded image of the candidate object; and
selecting a second object of interest corresponding to the first object of interest as a result of the searching, and sending the selected second object of interest to the client device.

16. The system of claim 15, wherein the system comprises a server and the client device is a mobile device.

17. The system of claim 15, wherein the processor further performs operations comprising:
identifying a region of interest in the degraded image, where the region of interest contains the first object of interest; and
wherein determining the representation of the feature of the degraded image includes determining a representation of a feature of the region of interest.

18. The system of claim 15, wherein the processor further performs operations comprising:
receiving accelerometer data regarding a device used to capture the degraded image;
estimating a motion blur in the degraded image using the accelerometer data; and
determining the degraded representation of the feature of the non-degraded image of the candidate object using the estimated motion blur.

19. A computer program product encoded on a tangible, non-transitory storage medium, the product comprising computer readable instructions for causing one or more processors to perform operations comprising:
receiving a degraded image of a first object of interest;
determining a representation of a feature of the degraded image;
searching a population of objects using a genetic algorithm, where the genetic algorithm includes calculating a fitness score for a candidate object using a fitness function that compares the representation of the feature of the degraded image to a degraded representation of a feature of a non-degraded image of the candidate object; and
selecting a second object of interest corresponding to the first object of interest as a result of the searching.

20. The computer program product of claim 19, further having instructions stored thereon which, when executed by the processor, causes the processor to perform operations comprising:
identifying a region of interest in the degraded image, where the region of interest contains the first object of interest; and
wherein determining the representation of the feature of the degraded image includes determining a representation of a feature of the region of interest.

21. The computer program product of claim 19, further having instructions stored thereon which, when executed by the processor, causes the processor to perform operations comprising:
  receiving context information about the degraded image; and
  wherein the searching is biased based on the context information.

22. The computer program product of claim 19, further having instructions stored thereon which, when executed by the processor, causes the processor to perform operations comprising:
  receiving accelerometer data regarding a device used to capture the degraded image;
  estimating a motion blur in the degraded image using the accelerometer data; and
  determining the degraded representation of the feature of the non-degraded image of the candidate object using the estimated motion blur.

* * * * *